United States Patent [19]
Wolbers

[11] Patent Number: 5,460,716
[45] Date of Patent: Oct. 24, 1995

[54] REVERSE OSMOSIS WATER PURIFICATION SYSTEM HAVING A PERMEATE DIAPHRAGM PUMP

[75] Inventor: Ralf Wolbers, Schuttorf, Germany

[73] Assignee: Wapura Trinkwassereinigungs GmbH, Schuttorf, Germany

[21] Appl. No.: 306,534

[22] Filed: Sep. 15, 1994

Related U.S. Application Data

[63] Continuation of Ser. No. 29,479, Mar. 11, 1993, abandoned.

[51] Int. Cl.⁶ ................................................ B01D 61/12
[52] U.S. Cl. .................... 210/136; 210/257.1; 210/258; 210/416.3
[58] Field of Search ........................... 210/136, 195.2, 210/257.1, 257.2, 258, 321.65, 416.1, 416.3

[56] References Cited

U.S. PATENT DOCUMENTS

| | | | |
|---|---|---|---|
| 3,887,463 | 6/1975 | Bray . | |
| 4,124,488 | 11/1978 | Wilson | 210/416.3 |
| 4,705,625 | 11/1987 | Hart, Jr. . | |
| 4,969,991 | 11/1990 | Valadez | 210/195.2 |
| 5,053,143 | 10/1991 | Miller et al. | 210/257.2 |
| 5,112,489 | 5/1992 | Hartmann | 210/195.2 |

FOREIGN PATENT DOCUMENTS

| | | |
|---|---|---|
| 0438372A2 | 7/1991 | European Pat. Off. . |
| 2406609 | 5/1979 | France . |
| 3734600A1 | 5/1989 | Germany . |
| 3734600C2 | 6/1991 | Germany . |

*Primary Examiner*—Robert A. Dawson
*Assistant Examiner*—W. L. Walker
*Attorney, Agent, or Firm*—Blakely, Sokoloff, Taylor & Zafman

[57] ABSTRACT

A permeate pump located between a reverse osmosis water filter and an accumulator of a reverse osmosis water purification system. The permeate pump increases the pressure of the permeate water delivered to the accumulator. The permeate pump is driven by the pressure of the concentrate water that is introduced into the reverse osmosis filter.

6 Claims, 1 Drawing Sheet

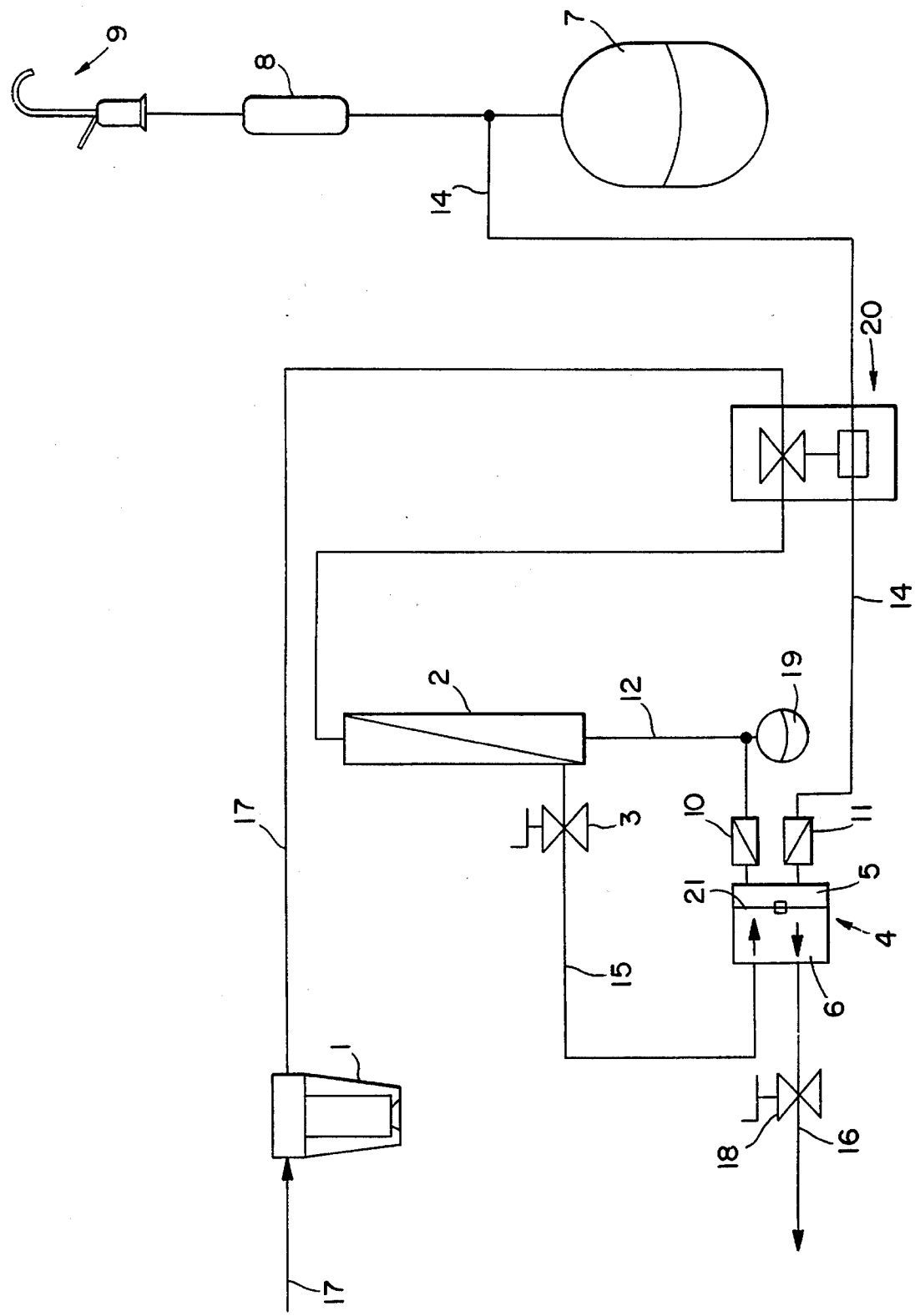

REVERSE OSMOSIS WATER PURIFICATION SYSTEM HAVING A PERMEATE DIAPHRAGM PUMP

This is a continuation of application Ser. No. 08/029,479 filed Mar. 11, 1993, now abandoned.

The invention relates to a drinking water purifier according to the preamble of the main claim.

A drinking water purifier, which forms a class, is described in the DE 37 34 600 C2. The reverse osmosis diaphragm, which is under a pressure, e.g. the typical city supply water pressure of 6 bar, fills an accumulator, in which the cleaned water is then ready for consumption. In so doing, the underlying theory is that the production volume and the permeate quality depend predominantly on the effective differential pressure, acting on one and the other side of the diaphragm. The lower the differential pressure is, the poorer the quality is and the smaller is the production volume.

An increasing pressure acts over the filling of the accumulator on the reverse osmosis diaphragm, abbreviated to "RO module" in the following; and it is, therefore, already known to put a hydraulic shutoff valve into the untreated water pipe feed and the pipe between RO module and accumulator, said shutoff valve operating in such a manner that the system is shut off when only about 1.2 to 2 bar differential pressure are still acting over the RO module.

Tests have shown that in systems belonging to the state of the art more than 90 liters of waste water are produced in order to fill an accumulator with 10 liters of purified water. This process requires almost five hours. A draw off amount of 2 liters is not balanced again until after three hours. At the same time 57 liters of waste water are accummulated, a process that corresponds to a yield of only 3.4%.

Since during reverse osmosis production amount and permeate quality depend significantly on the effective differential pressure, the invention is based on the problem of providing a drinking water purifier, in which no significant counterpressure is produced on the permeate side of the RO module, but the system works, nevertheless, with an accumulator on the delivery side.

This problem on which the invention is based is solved by the teaching of the patent claim.

Advantageous embodiments are explained in the dependent claims.

Expressed in other words: it is proposed that the purified water, thus the socalled permeate, is conveyed through a pump into the accumulator. This solution is achieved in the simplest manner by utilizing the water line pressure as the drive energy for the permeate pump, under which pressure the waste water or the concentrate of the RO module stands. The permeate pump is formed by preferably a diaphragm pump. The pump chamber receives the permeate flowing under pressure out of the RO module, wherein the pump diaphragm is slowly bent into one direction. When this bend of the diaphragm has reached its longest and adjustable distance, it acts on a stop, by means of which a pressure holding valve put into the discharge pipe of the concentrate behind the pump is closed. A pressure holding valve connected between RO module and the permeate pump either leaks intentionally, so that pressure builds up by way of a dynamic pressure on the working side of the permeate pump or the pressure holding valve, which is put here, is opened, so that then the pressure is introduced into the working side of the pump.

In this manner the arched diaphragm is arched in the reverse direction and acts now as a pump, which leads the water—permeate—collected in the pump side of the permeate pump by way of a corresponding pipe into the accumulator. At the same time the non-return valve put into the pipe from the RO module to the pump side of the permeate pump closes.

To avoid a higher dynamic pressure building up on the permeate side of the RO module during the pumping phase, a distribution reservoir can be built, according to another feature of the invention, into the pipe between the RO module and the pump side of the permeate pump. During the pump phase this distribution reservoir receives the permeate flowing out of the RO module.

In the embodiment described above the accumulator is filled up to the line pressure, with which the system is driven. On the permeate side of the RO module a slight counterpressure, which, however, can be overlooked, is produced toward the end of the filling procedure by means of the small pressure differential between accumulator and line pressure. The system is shut off in that the diaphragm pump no longer moves as a consequence of the pressure adjustment on both sides. Thus, the control process described above for the pressure holding valves is interrupted.

One drawback of the system described above is that every minimum amount taken from the accumulator is immediately reproduced. Since, however, the first 10 to 15 minutes of the operating mode of reverse osmosis do not produce any optimal water, the constant removal of amounts below half a liter results in the water in the storage tank becoming increasingly worse.

To eliminate this drawback it is proposed according to another feature of the invention that a hydraulically driven shutoff valve is put into the untreated water supply pipe to the RO module and into the pipe between the permeate pump and the accumulator. This hydraulic shutoff valve blocks the water feed to the RO module, when the storage pressure approaches a specific difference at the level of the line pressure, for example a difference ranging from 1.2 to 2 bar. After the storage pressure has dropped by about 1 bar due to the removal of water, the untreated water feed is released again.

One embodiment of the invention will be explained with reference to the diagram of connections in the following.

The drawing depicts an untreated water feed pipe 17 into which a prefilter 1 is put. This untreated water feed pipe 17, which is under a line pressure of 6 bar, for example, leads to the inlet side of a reverse osmosis module 2.

This RO module 2 is equipped on the opposite side with an outlet pipe 12 for the permeate, which leads to a permeate pump 4. A distribution reservoir 19 is connected between the RO module 2 and the permeate pump 4; and also a non-return valve 10, which opens the RO module 2 in the flow direction to the permeate pump 4, whereby this non-return valve can also be built into the pump 4. A permeate pipe 14 leads from the permeate pump 4 to an accumulator 7 and from there by way of an afterfilter 8 to an outlet 9.

A non-return valve 11, which opens only in the flow direction to the accumulator 7, is disposed in this permeate pipe 14 directly after leaving the permeate pump 4 or within the permeate pump 4.

The permeate pump 4 exhibits a pump side 5 and a working side 6, these two chambers being separated by a diaphragm 21. Attached to the working side 6 is a concentrate feed pipe 15, into which in the illustrated embodiment is put a defined leaky pressure holding valve 3, and to the working side 6 is attached a discharge pipe 16, into which a pressure holding valve 18 is also put.

In addition, a hydraulic shutoff valve 20 or an adjustable differential pressure switch can be put into the untreated water pipe 17 and into the permeate pipe 14, so that at a specific, selectable differential pressure between the pressure in the untreated water feed pipe 17 and the pressure in the accumulator 7 or the pipe 14 the system is shut off.

The illustrated system works as follows.

The permeate flowing out of the RO module 2 by way of pipe 12 is virtually pressureless and flows through the opened non-return valve 10 into the pump side 5 of the permeate pump 4 and arches here by means of the slight dynamic pressure the diaphragm 21, which is shown in the zero position, to the left. As soon as the diaphragm 21 has reached its adjusted, furthest distance, the pressure holding valve 18, which was open up until now, closes by way of a mechanical, electric or hydraulic apparatus, so that at this stage working pressure can be generated on the working side 6 of the permeate pump 4. In this manner the diaphragm 21 is moved to the right in the pump 4 and the permeate existing on the pump side is conveyed through the non-return valve 11 into the permeate line 14 and thus into the accumulator 7. When the diaphragm 21 has affected its farthest distance to the right, the switching mechanism changes over again, so that now the pressure holding valve 3 is closed and the pressure holding valve 18 is opened, so that now with the pump side 5 being pressurized by way of the pipe 12 the diaphragm 21 can be moved again into the other direction 5 and thus the concentrate located in the working side 6 drains into the discharge pipe 16.

The distribution reservoir 19 serves to receive the permeate flowing out of the RO module when valve 10 is closed, so that the RO module 2 can also continue to work during the pump phase and no higher dynamic pressure can build up on the permeate side of the RO module 2.

I claim:

1. A reverse osmosis water purification system, comprising:

a reverse osmosis water membrane unit that receives concentrate water at a first pressure and produces permeate water at a second pressure that is lower than the first pressure of said concentrate water, said reverse osmosis water membrane unit having a permeate outlet and a concentrate outlet;

a permeate pump which has a diaphragm that separates a pump chamber from a working chamber, said pump chamber being coupled to said permeate outlet of said reverse osmosis membrane unit and said working chamber being coupled to said concentrate outlet of said reverse osmosis membrane unit;

a first valve that is coupled to said working chamber of said permeate pump and a drain line, said first valve is continuously cycled between a first position that provides fluid communication between said working chamber and the drain line to allow permeate water to flow into said pump chamber, and a second position which terminates fluid communication between said working chamber and the drain line so that concentrate water can flow into said working chamber to pump the permeate water out of said pump chamber; and, a storage tank that is coupled to said pump chamber of said permeate pump.

2. The system as recited in claim 1, further comprising a second valve that is coupled to said working chamber and said concentrate outlet of said reverse osmosis water membrane unit, said second valve is continuously cycled, to provide fluid communication between said concentrate outlet and said working chamber when said first valve is in the second position, and terminates fluid communication between said concentrate outlet and said working chamber when said first valve is in the first position.

3. The system as recited in claim 2, further comprising a first one-way valve coupled to said pump chamber and said permeate outlet.

4. The system as recited in claim 3, further comprising a second one-way valve between said pump chamber and said storage tank.

5. The system as recited in claim 1, further comprising a shut-off valve that prevents fluid communication between said pump chamber and said storage tank when an output pressure of said permeate pump reaches a predetermined pressure.

6. The system as recited in claim 1, further comprising an accumulator coupled to said permeate outlet and said pump chamber.

\* \* \* \* \*